US012275387B2

(12) United States Patent
Shakya et al.

(10) Patent No.: US 12,275,387 B2
(45) Date of Patent: Apr. 15, 2025

(54) HYBRID SYSTEM EMISSIONS MANAGEMENT

(71) Applicant: Cummins Inc., Columbus, IN (US)

(72) Inventors: Bijesh M. Shakya, Columbus, IN (US); Kesavan Ramakrishnan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 69 days.

(21) Appl. No.: 18/014,403

(22) PCT Filed: May 27, 2021

(86) PCT No.: PCT/US2021/034638
§ 371 (c)(1),
(2) Date: Jan. 4, 2023

(87) PCT Pub. No.: WO2022/010589
PCT Pub. Date: Jan. 13, 2022

(65) Prior Publication Data
US 2023/0286489 A1    Sep. 14, 2023

Related U.S. Application Data

(60) Provisional application No. 63/049,836, filed on Jul. 9, 2020.

(51) Int. Cl.
*B60W 10/08* (2006.01)
*B60W 10/06* (2006.01)
(Continued)

(52) U.S. Cl.
CPC ............ *B60W 10/06* (2013.01); *B60W 10/26* (2013.01); *F01N 11/002* (2013.01); *F02D 29/02* (2013.01);
(Continued)

(58) Field of Classification Search
CPC ...... B60W 10/06; B60W 10/08; B60W 10/26; B60W 20/16; B60W 2510/244;
(Continued)

(56) References Cited

U.S. PATENT DOCUMENTS 9,403,524 B2 *   8/2016   Lear .................... B60W 30/194
2009/0150059 A1   6/2009   Santoso
(Continued)

OTHER PUBLICATIONS

International Search Report and Written Opinion for International patent application No. PCT/US2021/034638, filed May 27, 2021, mailed Aug. 24, 2021.

*Primary Examiner* — Gonzalo Laguarda
(74) *Attorney, Agent, or Firm* — Faegre Drinker Biddle & Reath LLP

(57) ABSTRACT

Emissions management systems for engines in hybrid systems include a sensor assembly and a controller. Sensor assembly is configured to provide an activation signal in response to an engine start event and to detect emissions information, including information indicative of an engine power, a driver demanded power, a catalyst temperature, a battery state of charge, and a battery temperature. Controller communicates with sensor assembly and is configured to: receive activation signal and, in response, emissions information from sensor assembly; determine an emissions reduction mode having a threshold value for catalyst temperature and having an engine power corresponding thereto; monitor emissions information; compare catalyst temperature to threshold value; cause the engine to operate in emissions reduction mode while catalyst temperature is less than threshold value; and allow the engine to operate in a normal operation mode while catalyst temperature is greater than or equal to the threshold value.

20 Claims, 5 Drawing Sheets

(51) Int. Cl.
 *B60W 10/26* (2006.01)
 *F01N 11/00* (2006.01)
 *F02D 29/02* (2006.01)
 *F02D 41/02* (2006.01)
 *F02D 41/06* (2006.01)
 *B60W 20/16* (2016.01)

(52) U.S. Cl.
 CPC ....... *F02D 41/0255* (2013.01); *F02D 41/062* (2013.01); *B60W 20/16* (2016.01); *B60W 2510/244* (2013.01); *B60W 2510/246* (2013.01); *B60W 2710/0677* (2013.01); *F01N 2590/11* (2013.01); *F01N 2900/08* (2013.01); *F01N 2900/104* (2013.01); *F01N 2900/1602* (2013.01); *F01N 2900/1626* (2013.01); *F02D 2200/0802* (2013.01)

(58) Field of Classification Search
 CPC .... F01N 11/002; F02D 29/02; F02D 41/0255; F02D 41/062
 See application file for complete search history.

(56) References Cited

U.S. PATENT DOCUMENTS

| | | |
|---|---|---|
| 2009/0199560 A1 | 8/2009 | Maier |
| 2017/0021824 A1 | 1/2017 | Johri et al. |
| 2019/0047547 A1* | 2/2019 | Johri .................... B60W 10/06 |
| 2019/0118793 A1 | 4/2019 | Jang |
| 2019/0234367 A1 | 8/2019 | Pursifull et al. |

\* cited by examiner

HYBRID SYSTEM EMISSIONS MANAGEMENT

CROSS-REFERENCE TO RELATED APPLICATIONS

The present application claims priority to International Patent Application No. PCT/US2021/034638, filed May 27, 2021, which claims priority to U.S. Patent Application No. 63/049,836, filed Jul. 9, 2020, the disclosures of which are hereby expressly incorporated herein by their reference.

GOVERNMENT SUPPORT CLAUSE

This invention was made with Government support under DE-AC02-06CH11357 awarded by DOE. The Government has certain rights in this invention.

FIELD OF THE DISCLOSURE

The present disclosure generally relates to alternative fuel vehicles ("AFVs") and more particularly to systems for managing emissions associated with such AFVs.

BACKGROUND

Controlling emissions has become increasingly prevalent with respect to engines common across a variety of applications, including in generators and vehicles. Common operation of an internal combustion engine produces emissions that then need to be managed. In a vehicle, the powerplant or powerplant system refers to the components that provide the power to propel the vehicle. These components include the engine, transmission, drive/propeller shaft, differentials, and final drive. In operation and for an internal combustion engine, the engine combusts a fuel to generate mechanical power in the form of rotating a crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to affect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel). Exhaust gas from the combustion is passed through an aftertreatment system, which typically incudes catalytic converters to reduce toxic emissions in exhaust gas into less-toxic pollutants and/or exhaust gas recirculation to reuse exhaust gas in future combustion events.

Conventional hybrid engine systems generally include both an electric motor and an internal combustion engine that are capable of operating jointly or independently to power the drivetrain in order to propel the vehicle. In regard to a hybrid vehicle, there may be various configurations. For example, in a parallel configuration both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor. In typical operation of the hybrid vehicle, the electric motor is enabled on demand or according to one more predefined control strategies. For example, the electric motor may be used during engine start events such as cold start events. And some hybrid vehicles may turn off the internal combustion engine at prolonged stops and solely use the electric motor to provide the initial acceleration when acceleration is demanded by the driver.

Regardless of their configuration, during operation using the engine or both the engine and the motor, hybrid engine systems produce emissions in the form of exhaust gas that is then passed through catalytic converters in an exhaust aftertreatment system and/or recirculated. Thus, reducing emissions often depends on the efficiency of the catalytic converter and/or exhaust gas recirculation. Emission conversion efficiency of catalytic converters is often a function of temperature, where increasing temperature results in increasing efficiency. Emission reduction strategies therefore often employ a catalyst warm up approach by retarding spark timing, adding parasitic load to the engine, using external heaters or heated catalytic converters for example until catalysts in the catalytic converter become fully active at a threshold temperature. Other emission reduction strategies include increasing exhaust gas recirculation. But these approaches are often costly and complex or simply not feasible in certain applications.

SUMMARY

In general, several embodiments relating to engine emissions management systems are disclosed herein. Such engine emissions management systems include an emissions management system that may reduce emissions from a hybrid powerplant. The emissions management system for an engine in a hybrid system may include a sensor assembly and a controller. The sensor assembly may be configured to provide an activation signal in response to an engine start event and to detect emissions information, including information indicative of an engine power, a driver demanded power, a catalyst temperature, a battery state of charge, and a battery temperature. The controller may be in communication with the sensor assembly. The controller may be configured to receive the activation signal and, in response thereto, the emissions information from the sensor assembly. The controller may be configured to determine an emissions reduction mode having a threshold value for the catalyst temperature and having the engine power corresponding thereto. The controller may be configured to monitor the emissions information. The controller may be configured to compare the catalyst temperature to the threshold value. The controller may be configured to cause the engine to operate in the emissions reduction mode while the catalyst temperature is less than the threshold value. The controller may be configured to allow the engine to operate in a normal operation mode while the catalyst temperature is greater than or equal to the threshold value.

In embodiments, the nature of determining the threshold value may vary. The threshold value may be predetermined, for example, by calibrating the emissions management system. In embodiments, the threshold value is predefined in the memory device of the controller. The memory device may have a plurality of stored threshold values each of which is characterized according to at least one engine parameter. The controller may determine the threshold value by retrieving the threshold value from the memory device.

In embodiments, the hybrid engine management system may be activated by different engine start events. The engine start event may be a cold start of the engine. The engine start event may be warm start event, such as start events shortly after stopping the engine (e.g., parking after a commute, engine stopping during a commute, traffic, etc.)

In embodiments, the controller is further configured to determine a percentage of the driver demanded power that is achievable by a battery based on at least one of the battery state of charge and the battery temperature. As such, in series hybrid vehicles, the controller may divide driver demanded power between the battery and a combination of the engine and a connected electric motor (e.g., a "genset") based on the battery state of charge and battery temperature.

The present disclosure includes methods of managing engine emissions of a hybrid system. The method may include providing an activation signal in response to an engine start event. The method may include detecting emissions information, including information indicative of an engine power, a driver demanded power, a catalyst temperature, a battery state of charge, and a battery temperature. The method may include receiving the activation signal and, in response thereto, the emissions information. The method may include determining an emissions reduction mode having a threshold value for the catalyst temperature and having the engine power corresponding thereto. The method may include monitoring the emissions information. The method may include comparing the catalyst temperature to the threshold value. The method may include causing an engine to operate in the emissions reduction mode while the catalyst temperature is less than the threshold value. The method may include allowing the engine power to operate in a normal operation mode while the catalyst temperature is greater than or equal to the threshold value.

Throughout the method, battery power may be prioritized and leveraged over engine power during a cold start event. In embodiments, when the catalyst temperature is less than the threshold value, the method may include determining a power output of the engine during a warming time period that allows a catalyst to reach the threshold value given the power output and determining a percentage of the driver demanded power that is achievable by a battery based on at least one of the battery state of charge and the battery temperature. When the driver demanded power may be met by the engine power in the emissions reduction mode, the method may include causing the engine to meet the driver demanded power. When the driver demanded power exceeds the power output of the engine operating in the emissions reduction mode and the percentage of the driver demanded power that is achievable by the battery may supplement the power output of the engine operating in the emissions reduction mode to meet the driver demanded power, the method may include causing the engine and the battery to meet the driver demanded power together. When the driver demanded power exceeds the power output of the engine operating in the emissions reduction mode and the percentage of the driver demanded power that is achievable by the battery, the method may include causing the engine to increase the power output beyond that corresponding to the emissions reduction mode. The method may include returning the engine to the emissions reduction mode upon absence of the driver demanded power and when the catalyst temperature is less than the threshold value. Together with causing the engine to increase the power output beyond that corresponding to the emissions reduction mode, the controller may be further configured to cause the battery to discharge a maximum percentage of the driver demanded power that is achievable by the battery.

The present disclosure includes a hybrid system including a hybrid powerplant and an emissions management system in operative communication with the hybrid powerplant. The hybrid powerplant may have an engine, a battery, an electric motor operatively connected to the engine and the battery, and an aftertreatment system operatively connected to the engine. The emissions management system may include a sensor assembly and a controller. The sensor assembly may be configured to provide an activation signal in response to an engine start event and to detect emissions information, including information indicative of an engine power, a driver demanded power, a catalyst temperature, a battery state of charge, and a battery temperature. The controller may be in communication with the sensor assembly. The controller may be configured to receive the activation signal and, in response thereto, the emissions information from the sensor assembly. The controller may be configured to determine an emissions reduction mode having a threshold value for the catalyst temperature and having the engine power corresponding thereto. The controller may be configured to monitor the emissions information. The controller may be configured to compare the catalyst temperature to the threshold value. The controller may be configured to cause the engine to operate in the emissions reduction mode while the catalyst temperature is less than the threshold value. The controller may be configured to allow the engine to operate in a normal operation mode while the catalyst temperature is greater than or equal to the threshold value.

The present disclosure may be used across a variety of platforms. For example, in embodiments, the hybrid powerplant is a series hybrid powerplant, a parallel hybrid powerplant, or a series-parallel hybrid powerplant.

Additional features and advantages of the present disclosure will become apparent to those skilled in the art upon consideration of the following detailed description of the illustrative embodiments exemplifying the disclosure as presently perceived.

The present disclosure provides a number of advantages. For example, the emissions management system may optimize emissions reduction by managing multiple parameters of the engine. In embodiments, the hybrid emissions management system has an overall reduced system out emission because exhaust flow rates are reduced while catalyst temperature reaches is high-efficiency threshold. Plus, the present disclosure may be used across a wide range of application without significantly contributing to their costs and complexity.

BRIEF DESCRIPTION OF THE DRAWINGS

The above-mentioned and other features and advantages of this disclosure, and the manner of obtaining them, will become more apparent, and will be better understood by reference to the following description of the exemplary embodiments taken in conjunction with the accompanying drawings, wherein.

Figure 1:
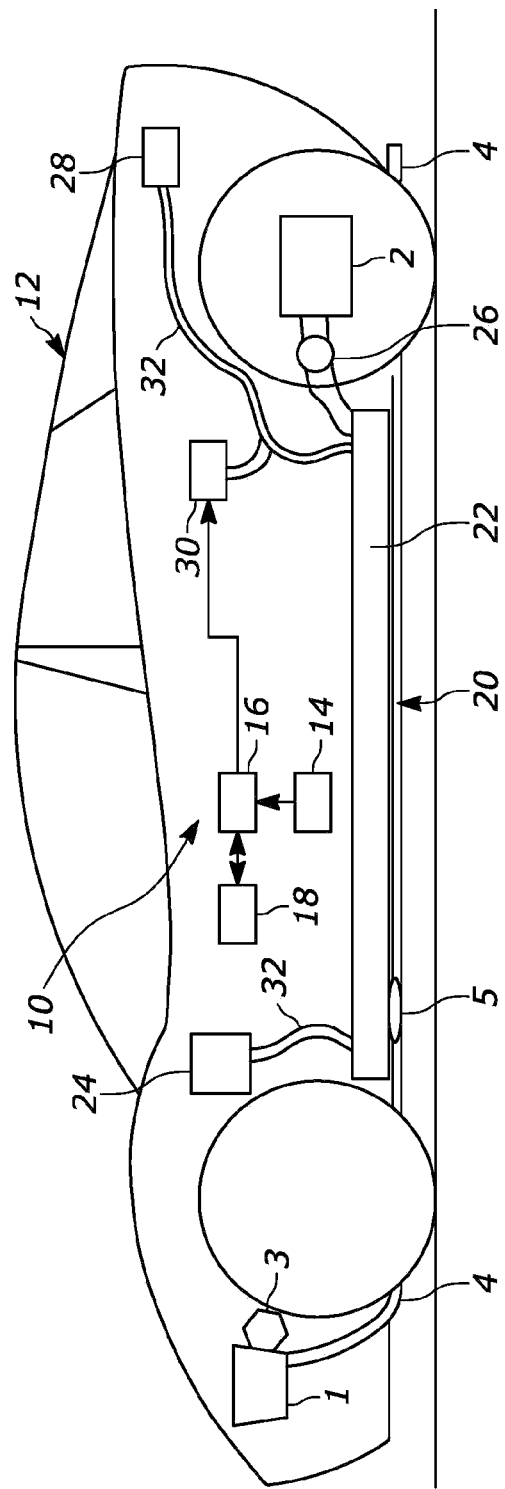
FIG. 1 is a schematic diagram of an emissions management system according to one embodiment of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

FIG. 1 shows a schematic diagram of a vehicle having an emissions management system 10 (also referred to as "system 10") for reducing emissions according to embodiments of the present disclosure. The present disclosure provides, among other things, an emissions management system 10, the features of which are discussed hereinafter, for reducing emissions during operation of an engine in a hybrid system. Internal combustion engines are used in a variety of hybrid systems, including those for electric generators and vehicles. These hybrid systems include an internal combustion engine 1 and at least one electric motor 2. The internal combustion engine 1, which produces toxic emissions during operation, and the electric motor 2 may operate independently or in tandem according to commands corresponding to a driver demanded power of the hybrid system. In a series hybrid vehicle as shown here, the internal combustion engine 1 may have a connected electric motor 3 (collectively referred to as a "genset") to provide electrical power for use by the vehicle. A majority or all the emissions from the hybrid system may be in the form of exhaust gas produced by the internal combustion engine 1, such as spark ignited gasoline engines and compression ignited diesel engines. In a typical hybrid vehicle, these emissions may be reduced by manipulating the exhaust gas (e.g., repurposing the exhaust gas through exhaust gas recirculation (EGR) for future combustion events). In addition, or in alternative, these emissions may be reduced by routing exhaust gas through a redox reaction (an oxidation and a reduction reaction) often performed via an aftertreatment system 4 with one or more catalysts (e.g., platinum, palladium, and rhodium) in a catalytic converter 5 such that toxic emissions are converted into less toxic emissions before exiting the vehicle's exhaust. Conversion efficiency of the catalytic converter 5, and the hybrid system by extension, may be characterized as a function of exhaust flow rate and exhaust temperature, which proportionally relates to the temperature of the catalyst.

As discussed herein, the present disclosure reduces emissions during operation of the engine 1 in a hybrid system by optimizing the operation of the catalyst independent of engine demand when possible. One such operation of the hybrid system includes an engine start event, such as a cold start event where the engine 1 (and therefore the exhaust) is at a low temperature relative to its operating temperature. Catalysts operate short of full efficiency until the engine exhaust gas heats the catalyst up to the temperature at which catalytic reactions are initiated within a catalytic converter 5. Emissions are therefore often highest during the cold start because the catalyst is not operating at full efficiency and additional fuel needs to be consumed to increase the exhaust gas temperature and warm the catalyst to operate at full efficiency. There is a point at which an exhaust temperature, a catalyst temperature, and an engine output are optimized such that emissions from the hybrid system are reduced. The present disclosure is configured to reduce engine emissions based on these and other parameters. For example, as described hereinafter, in an embodiment, the present disclosure may optimize the exhaust flow rate and the exhaust temperature by managing the engine output over time after a cold start engine event to thereby bring a catalyst temperature up to a threshold value without increasing overall system out emission.

Although discussed in relation to specific features, operations, and embodiments, it should be understood that the present disclosure should not be limited as such. For example, one skilled in the art will appreciate that embodiments similar to those discussed herein may be applied to numerous hybrid systems having engines or heat sources that produce emissions, some of which include those for vehicles, electrical generators, appliances, locomotives, and other machinery, none of which should be considered outside the scope of this disclosure. As another example, the present disclosure may be optimized for numerous types of emissions, including nitrous oxide (NOx), hydrocarbons (HCs), and carbon monoxide, none of which should be considered outside the scope of this disclosure. As yet another example, embodiments of the present disclosure may include information indicative of a catalyst temperature such as one or more of an exhaust temperature, an exhaust flow rate, an engine emission rate, and an engine output or similar engine parameters to be optimized such that emissions are reduced, none of which should be considered outside the scope of this disclosure.

A hybrid system may include the emissions management system 10 and a hybrid powerplant having an engine 1 (e.g., an internal combustion engine), an electric motor 2, a battery 22, and an aftertreatment system 4 as shown in FIG. 1. In this figure, an emissions management system 10 is shown in use with a series hybrid AFV 12. In other embodiments, however, the vehicle may be configured as another type of hybrid-powered vehicle (e.g., a parallel hybrid electric vehicle such as a strong or mild parallel hybrid electric vehicle, a series-parallel hybrid electric vehicle, etc.). In a series hybrid AFV 12, the engine 1 may drive an electric generator 3, which both charges a battery 22 and powers an electric motor 2 that moves the vehicle, instead of directly driving the wheels. In operation, the electric motor 2 may be operatively connected to the engine 1 and the battery 22, the aftertreatment system 4 may be operatively connected to the engine 1, and the system 10 may be in operative communication with the hybrid powerplant. The system 10 generally includes a sensor assembly 14, a controller 16 and a transceiver 18. The sensor assembly 14 can include at least one sensor. The AFV 12 generally includes a fuel system (e.g., a fuel tank and associated fuel lines, each not shown) for the engine 1, an aftertreatment system 4, a high voltage system 20, including a battery 22 (or collection of batteries), a DC-DC converter 24, and a drive unit 26. The components of the high voltage system 20 are connected via high voltage cabling 32. In the AFV 12, harmful emissions from the engine are passed through the aftertreatment system 4 (e.g., via an exhaust) and converted by catalyst (e.g., in a catalytic converter 5) into less harmful emissions before exiting the aftertreatment system 4 (e.g., via a tailpipe). The battery 22 may include one or more cells that employ any of various suitable energy storage technologies such as lithium-ion batteries. The battery 22 provides the stored electricity to the drive unit 26, which converts DC current into 3-phase AC current that one or more electric motors 2 use to power the rear wheels.

The sensor assembly 14 of the system 10 may include one or more sensor devices as described herein. Such sensor devices may include a temperature sensor, a torque transducer, an optical sensor, and/or a flow sensor. The sensor assembly 14 may include one or more accelerometers or other motion detection devices that detect acceleration or deceleration of the AFV 12 that provides start-and-stop functionality. In any event, the sensor assembly 14 may provide an activation signal to the controller 16 when an activation event occurs such as an engine start event. The activation signal initiates a response by the system 10 in the manner described below.

Figure 2:
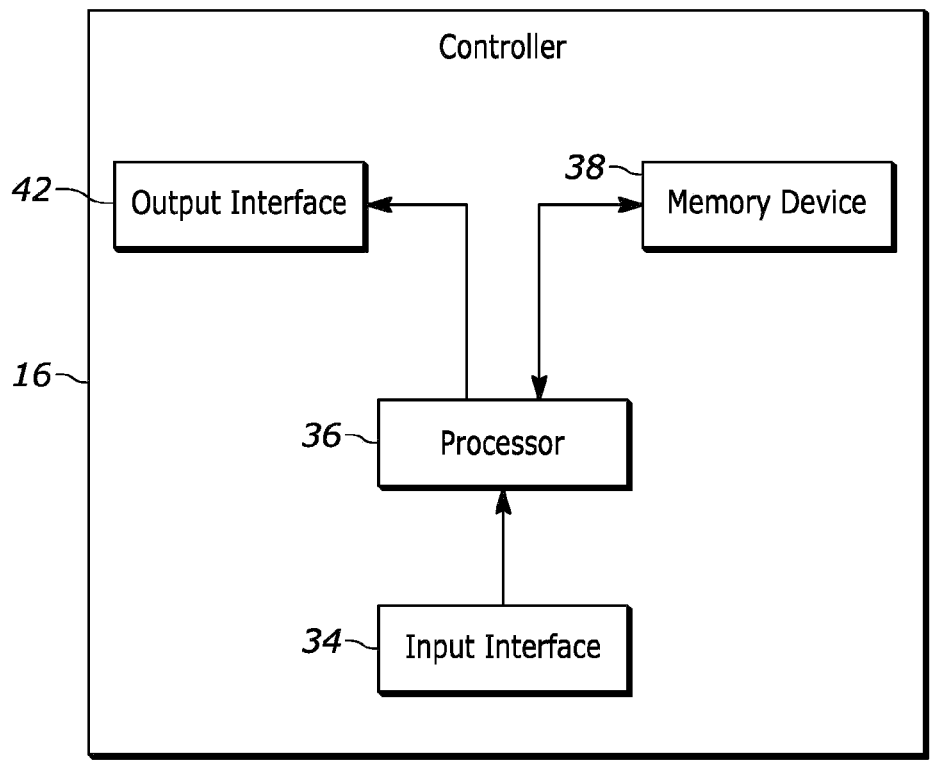
FIG. 2 is a block diagram of a controller of the system of FIG. 1.

The controller 16 may be a stand-alone device or may be part of an Engine Control Module ("ECM") or System Control Module (SCM) in vehicles having internal combustion engines. The controller 16 may include one or more computing devices having memory, storage, processing and communication hardware, firmware and/or software. The controller 16 may be a single device or a distributed device, and the functions of the controller 16 may be performed by hardware and/or as computer instructions on a non-transient computer readable storage medium. As shown in FIG. 2, in certain embodiments the controller 16 may include an input interface 34, a processor 36, a memory device 38, and an output interface 42. The input interface 34 may communicate the activation signals from the sensor assembly 14 to the processor 36. The processor 36 may be programmed to respond to receipt of an activation signal by performing one or more of a variety of functions as described herein.

In certain embodiments, the processor 36 responds to receipt of an activation signal by generating data that is communicated by output interface 42 to transceiver 18. The processor 36 may generate data by accessing memory device 38 to obtain information stored in the memory device 38 identifying emissions information of the AFV 12.

Figure 3:
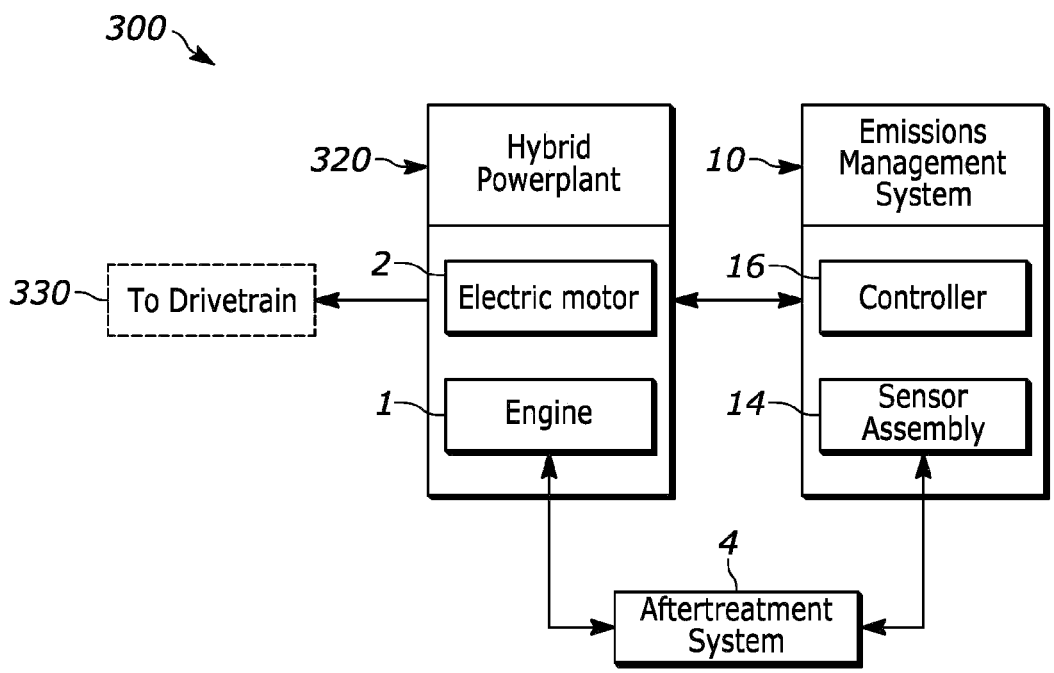
FIG. 3 is a block diagram of a hybrid powerplant.

FIG. 3 is a block diagram of a hybrid system 300 that is a hybrid vehicle. As shown, the hybrid system 300 may include an emissions management system 10, an aftertreatment system 4, and a hybrid powerplant 320 having both an engine 1 and one or more electric motors 2. In embodiments, the hybrid powerplant 320 also includes connected components, ancillary components, and accessories of the hybrid vehicle (as discussed above). Some of such include a fuel system (e.g., for the engine 1), a power system (e.g., batteries for the electric motor 2), and an aftertreatment system 4 (e.g., catalytic converters and exhaust pipes extending to and from the catalytic converters). The emissions management system 10 may be in communication with the hybrid powerplant 320, which may output to the drivetrain 330 (e.g., a transmission, differentials, and connected shafts) to deliver power to driving wheels of the drivetrain 330. The engine 1 and sensor assembly 14 may be in communication with the aftertreatment system 4, for example, to process exhaust gas from the engine 1 and to detect the temperature of the exhaust gas with the sensor assembly 14.

As shown, the emissions management system 10 may include a sensor assembly 14 and a controller 16. The sensor assembly 14 may be configured to provide an activation signal in response to an engine start event and to detect emissions information, including information indicative of an engine power, a driver demanded power, a catalyst temperature, a battery state of charge, and a battery temperature. In embodiments, the information indicative of the catalyst temperature may include detecting at least one of a temperature drop across a catalytic converter connected to the engine and a conversion efficiency of the catalytic converter connected to the engine. The controller 16 may be in communication with the sensor assembly 14. The controller 16 may be configured to receive the activation signal and, in response thereto, the emissions information from the sensor assembly 14. The controller 16 may be configured to determine an emissions reduction mode having a threshold value for the catalyst temperature and having the engine power corresponding thereto. As discussed further hereinafter, the controller may be configured to monitor the emissions information and to compare the catalyst temperature to the threshold value. While the catalyst temperature is less than the threshold value, the controller 16 may be configured to cause the engine 1 to operate in an emissions reduction mode. While the catalyst temperature is greater than or equal to the threshold value, the controller 16 may be configured to allow the engine 1 to operate in a normal operation mode.

Upon an engine start event, the emissions management system 10 may be activated. In embodiments, the engine start event may be a cold start of the engine. In this way, the emissions management system 10 may operate during what are the most inefficient cycles of the hybrid powerplant 320 in terms of emissions reduction while exhaust temperatures rise from a low temperature (e.g., an ambient temperature) toward a normal operating temperature. Exhaust temperature measurements can be correlated to provide a reasonable indication of catalyst temperature. As noted prior, in addition to cold starts, some hybrid vehicles turn off their internal combustion engines 1 during long pauses in a commute (e.g., due to traffic, stop lights, parking, etc.). The emissions management system 10 may still activate in these Start/Stop cases (e.g., warm starts) as well as during some long pauses where the temperature of the catalyst (e.g., as indicated by the exhaust temperature) may have dropped below its threshold. Hence, the operation of the emissions management system 10 during these warm-start and long-pause cases may be similar to that during cold-start cases.

In reducing engine emissions (e.g., after activation), the emissions management system 10 may manage functions of the hybrid system 300 to optimize emissions reduction while allowing the hybrid powerplant 320 to meet the driver demanded power. Such management may include prioritizing leveraging the available power from battery-powered operation of the electric motor 2 over that of the engine 1. For example, when the catalyst temperature is less than a threshold temperature corresponding to efficient operation, the controller 16 may be configured to determine an operating point or power output of the engine 1 to warm the catalyst to the threshold temperature while generating reduced emissions during the warming time period (i.e., the engine 1 is operating in the emissions reduction mode). In response to a driver demand for power under these circumstances, the controller may be configured to determine a percentage of the driver demanded power that is achievable by the motor 2 based on at least one of the battery state-of-charge ("SOC") and the battery temperature. When the driver demanded power may be met by the engine 1 operating in the emissions reduction mode, the motor 2 is not used. When the driver demanded power exceeds the power output of the engine 1 operating in emissions reduction mode and the power that is achievable by the motor 2 given the current SOC of the battery 22 is sufficient to supplement the engine 1 power output to meet the driver demanded power, the controller 16 enables the motor 2 to provide the additional power. However, when the driver demanded power is greater than the output power of the engine 1 in emissions reduction mode and the available power of the motor 2 given the SOC of the battery 22, the controller 16 causes the engine 1 to operate at a greater power output operating point to meet the driver demanded power, even though the higher power operation during the catalyst warming period may result in greater emissions than the optimal operating conditions while not necessarily exceeding the legal emission limits. Greater emissions can be avoided by setting the minimum battery SOC such that it has buffers to provide power during the engine cold start or restart.

Figure 4:
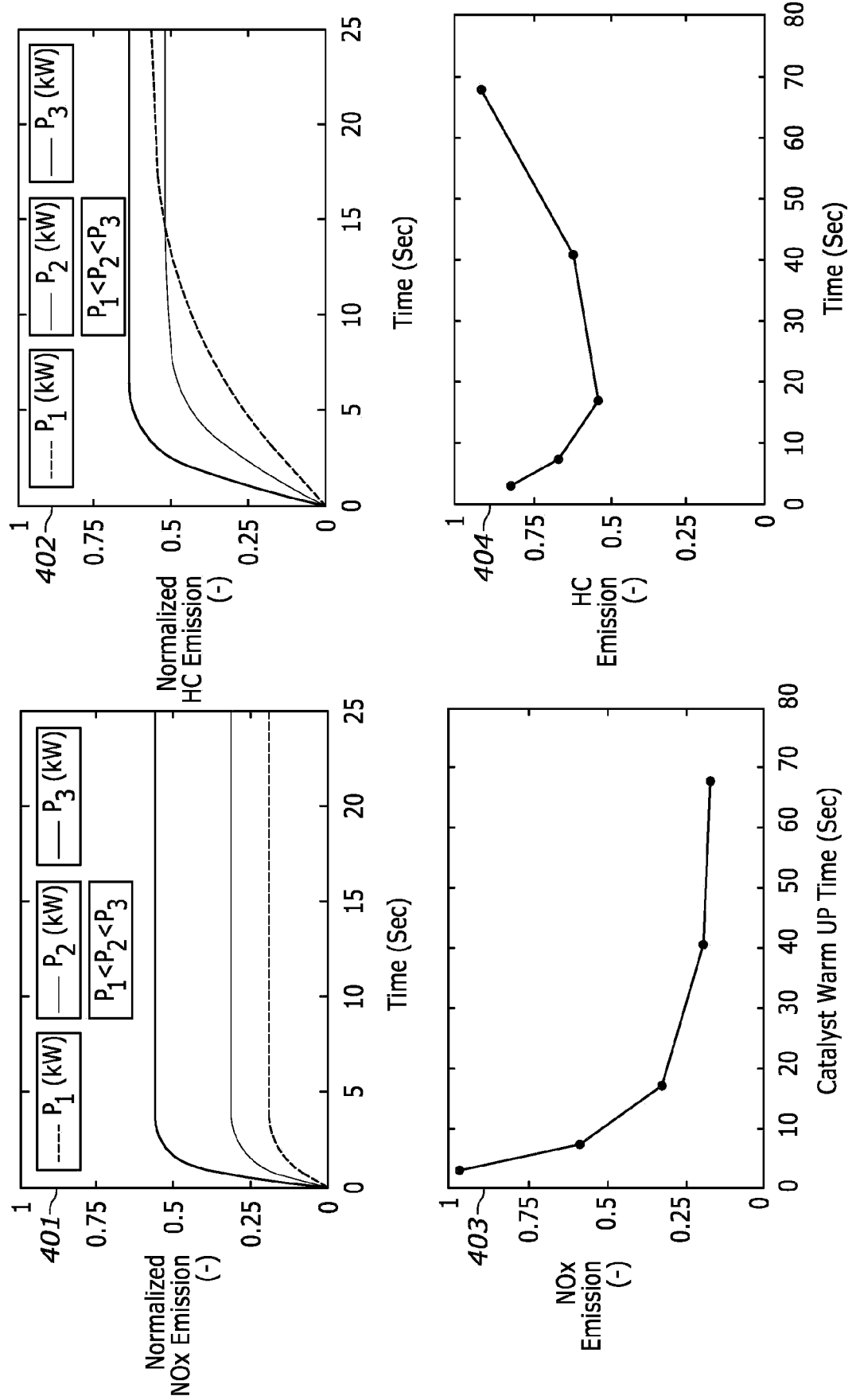
FIG. 4 is a series of diagrams showing information useful in determining a threshold value for catalyst temperature to be used by the emissions management system to thereby reduce emissions.
Figure 5:
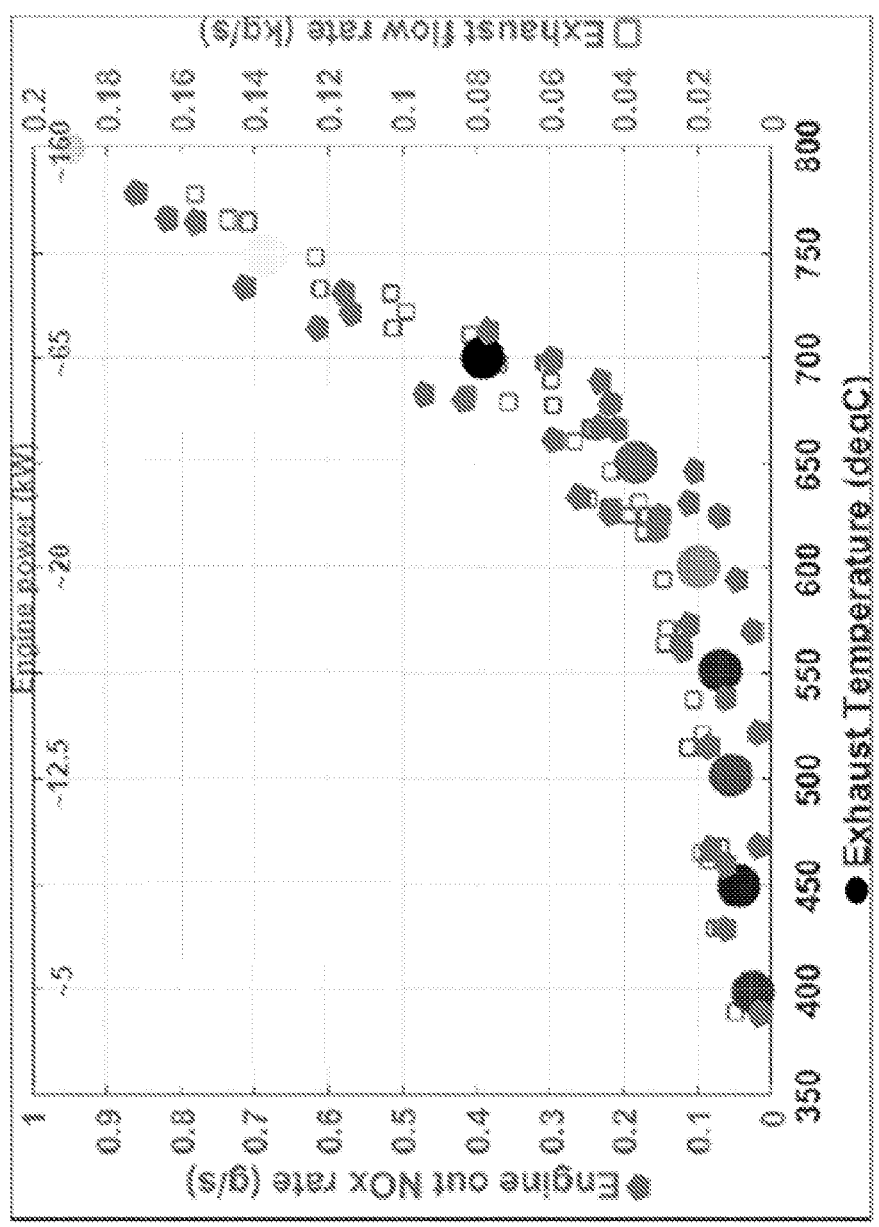
FIG. 5 is a diagram showing an example of the relationship between engine emissions, exhaust flowrate, engine output, and catalyst temperatures.

FIGS. 4 and 5 show diagrams displaying information useful in determining a threshold value for catalyst temperature to be used by the emissions management system 10 to thereby reduce emissions. FIG. 4 is a series of diagrams showing information useful in determining a target (P1, P2, or P3) for the engine power. Diagrams 401 and 402 show transient emissions for different engine powers (P1, P2, and P3) during a cold start for HC and NOx respectively. Diagrams 403 and 404 show transient emissions as a function of catalyst warm up time for HC and NOx respectively. FIG. 5 is a diagram showing an example of relationships between engine emissions (e.g., engine out NOx rate (g/s)), exhaust flowrate (kg/s), engine power (kW), and catalyst temperatures (degrees Celsius), Trends in the information useful in determining a threshold value for the catalyst temperature vary depending on the type of emissions and, as such, performance of the emissions management system may vary based on the particular emissions to be reduced. This variance is because of the difference in catalyst activity toward different emissions. As an example, FIG. 4 shows a comparison between NOx and HC. Specifically, transient system out emission of HC and NOx are shown as a function of different engine power utilized during cold start. It may be seen that for HC, when engine power is increased from P1 to P2 during cold start, overall HC emissions decrease. When engine power is further increased to P3, however, overall HC emissions increase, even though catalyst is warmed up faster. Thus, as noted prior, when targeting higher engine power for faster warm up, there is a tradeoff between faster catalyst warm up and increase in engine out emissions. As noted prior, different trends can be observed for NOx. Taken alone or together, the trends for HC and NOx may be used to find a threshold value for engine power that may be used by the system. In this example, P2 may be selected as the target for the engine power, for example, because it results in both relatively low NOx emissions and minimum HC emissions. These trends are not the only trends that may be observed with these data. Other useful trends from these data that are not discussed here in detail for brevity may be readily observed by one skilled in the art and should not be considered outside the scope of the present disclosure. As well, as discussed below, trends may be defined for specific data points and/or for a specific range of data points.

The setup of the hybrid system may also cause variances in the trends in the information useful in determining a threshold value for the catalyst temperature. For example, a target for the engine power may change depending on factors such as engine operation (e.g., including spark retard to increase exhaust temperature or not), aftertreatment system arrangement (e.g., close-coupled or underbody), etc.

Taking NOx as an example, emissions may be reduced by having the emissions management system determine a threshold value that is optimized for catalyst temperature. The relationship between engine emissions, exhaust temperature, exhaust flowrate, and engine power for stoichiometric engines (e.g. a 2.8 L natural gas engine) in a non-limiting example may be seen in FIG. 5. Exhaust flow rate and engine emission rate (e.g., for NOx) may be represented as a function of exhaust temperature and engine output. And it may be seen from this figure that engine emissions (NOx) rates may scale linearly with the exhaust flow rate. As well, despite increasing catalyst temperature faster, targeting higher exhaust temperatures (e.g., by increasing engine power) exponentially increases exhaust flow rate and subsequently engine emissions (NOx) rates. As a result, tailpipe NOx emission is also increased. Of particular note is the exponential increase in engine out NOx rates as the exhaust temperature goes beyond 600 degrees Celsius (corresponding to an engine power of about 20 kW), thereby presenting an emission penalty for faster catalyst warm up. With this example, the emissions management system may use 600 degrees as the threshold value for the exhaust temperature and operate the hybrid system accordingly.

The controller 16 may be configured to compare the emissions information to the threshold value, for example, during operation of the emissions management system. In embodiments, the threshold value may be predetermined. For example, the emissions management system may be calibrated to the specific parameters of the vehicle (e.g., size, capacity, etc. of the engine and/or construction of the vehicle and/or catalyst). In embodiments, the threshold value may be predefined in the memory device of the controller 16. The memory device may have a plurality of stored threshold values, each of which is characterized according to at least one engine parameter. The controller may determine the threshold value by retrieving the threshold value from the memory device. In embodiments, this process may be dynamically performed.

In embodiments, conventional approaches to controlling emissions may also be employed with the emissions management system. For example, any combination of the present disclosure and at least one of retarding spark timing, electrically heated catalysts, and EGR may be used. In embodiments, this combination may result in better emissions reduction than the present disclose, retarding spark timing, electrically heated catalysts, or EGR taken alone.

Figure 6:
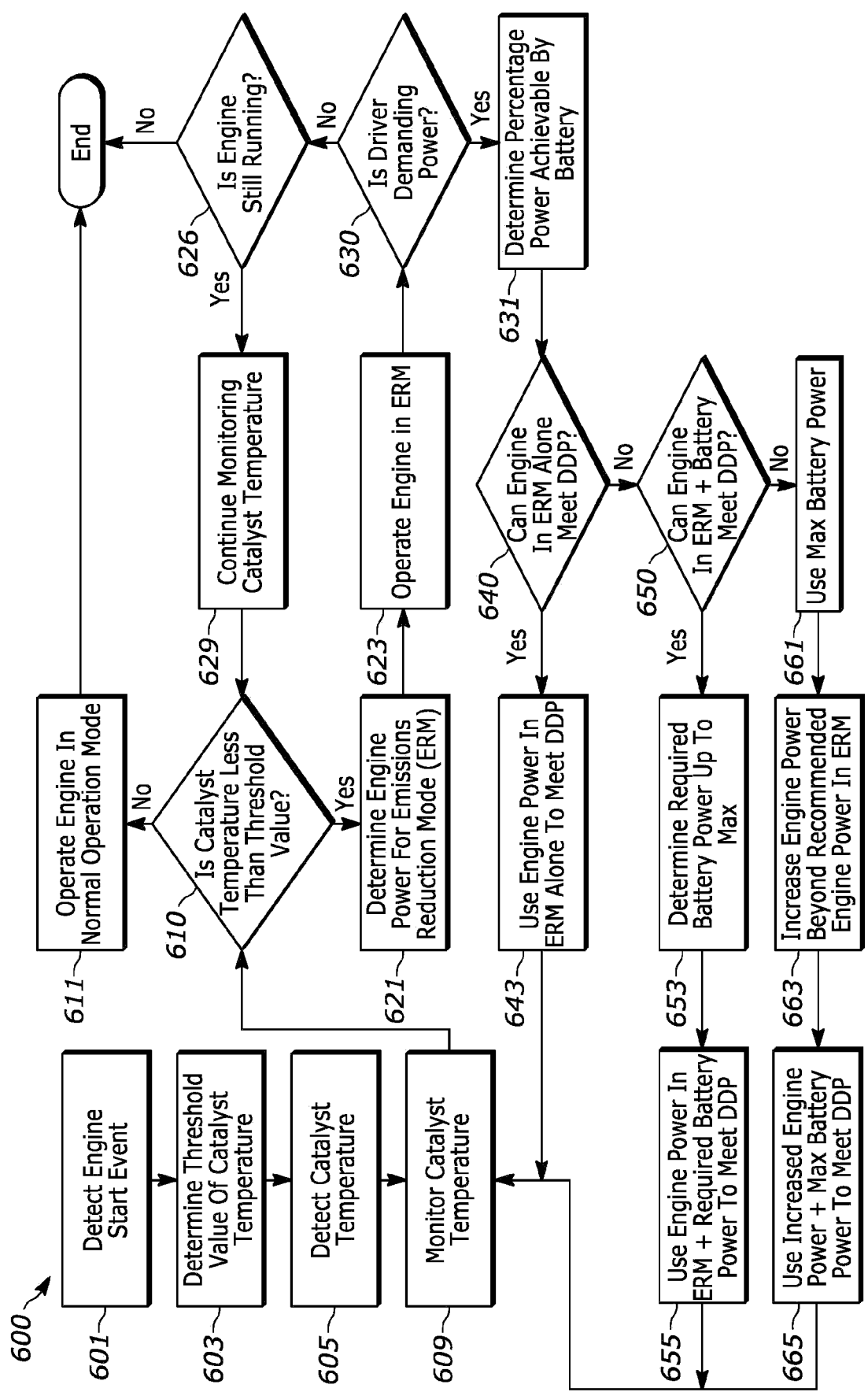
FIG. 6 is a flowchart for a method of managing engine emissions.

FIG. 6 is a flowchart showing a method 600 of managing hybrid system emissions. In embodiments, the method 600 may be performed by an emissions management system similar to those discussed elsewhere herein. The method 600 may include providing an activation signal in response to an engine start event, receiving the activation signal, and, in response thereto, receiving the emissions information. The method 600 may include determining a pre-threshold operation having a threshold value for the emissions information and having the engine power corresponding thereto. The method 600 may include detecting emissions information, including information indicative of an engine power, a driver demanded power, a catalyst temperature, a battery state of charge, and a battery temperature.

The method 600 may optimize operation of an engine after detecting a start event, beginning at step 601. For example, at step 603, the system may determine the threshold value. At step 605, the system may detect the catalyst temperature.

After the threshold value is determined, the method 600 may continue by using the threshold value to determine if emission-focused engine operation is needed. The method 600 may include comparing the catalyst temperature to the threshold value at step 610. The method 600 may include monitoring the emissions information. For example, at step 609, the catalyst temperature may be monitored. At step 610, the method 600 may include determining whether the catalyst temperature is less than the threshold value. If the catalyst temperature is not less than the threshold value, the method 600 may include allowing the engine to operate in a normal operation mode at step 611 after which, the method 600 may end. If, on the other hand, the catalyst temperature is less than the threshold value, the method 600 may continue by determining an engine power for the emissions reduction mode at step 621. At step 623, the method 600 may include causing the engine to operate in the emissions reduction mode while the catalyst temperature is less than the threshold value. At step 630, the method 600 may include determining whether the driver is demanding power, and if not, the method 600 may continue to step 626 to determine whether the engine is still running. If the engine is no longer running at step 626, the method 600 may end. But if the engine is still running at step 626, the method 600 may continue to step 631 to monitor the catalyst temperature before returning to step 610 to determine whether the catalyst temperature is less than the threshold value. If, however, at step 630 the driver is demanding power, the method 600 may continue and determine whether it can meet the driver demanded power without increasing emissions (e.g., without exiting the emissions reduction mode).

Driver demanded power may cause the engine to exit the emissions reduction mode. At step 631, the method 600 may include determining the percentage power achievable by the battery (e.g., to meet driver demand). As noted prior, this step may be based on the state-of-charge of the battery, the temperature of the battery, or both. Knowing the percentage power achievable by the battery, the method 600 can continue by determining what arrangement of power provided by the battery and power provided by the engine is appropriate to meet the driver demanded power. For example, the method 600 may resolve to using the engine alone to meet the driver demanded power. For example, the method 600 may continue by determining at step 640 whether the engine operating in the emissions reduction mode can meet the driver demanded power and, if so, at step 643, use the engine power in the emissions reduction mode alone to meet the driver demanded power. Thereafter, the method 600 can include returning to step 609 to monitor the catalyst temperature and then step 610 to determine whether the catalyst temperature is still less than the threshold value. If, on the other hand, the engine operating in the emissions reduction mode cannot meet the driver demanded power, the method 600 may resolve to use a combination of the battery and the engine. For example, the method 600 may continue by determining at step 650 whether the engine in the emissions reduction mode plus some percentage of the power achievable by the battery can meet the driver demanded power. If so, at step 653, the method 600 may include determining the required battery power (e.g., up to its maximum given its state-of-charge) under these circumstances. At step 655, the method 600 can then include using the engine in the emissions reduction mode and the required battery power to meet the driver demanded power. But if the engine in the emissions reduction mode and the maximum battery power cannot meet the driver demanded power, the method 600 may allow the engine to operate beyond the emissions reduction mode.

At step 661, the method 600 has resolved that neither the engine operating in the emissions reduction mode alone nor the battery plus the engine operating in the emissions reduction mode can meet the driver demanded power. As such, the method 600 may now allow the engine to operate beyond the emissions reduction mode but still leverage some power from the battery. For example, at step 661, the method 600 may include using the maximum battery power, and at step 663, the method 600 may include increasing the engine power beyond the recommended engine power in the emissions reduction mode. At step 665, the method 600 may include using the increased engine power and the maximum battery power to meet the driver demanded power. Although these circumstances will now increase emissions over that in the emissions reduction mode, the driver demanded power is now met, and the engine may still operate at or near the recommended engine power for the emissions reduction mode (e.g., at some point less than in the normal operating mode) so as to reduce emissions as much as possible during this time. Afterward, the method 600 may include returning to step 610 to determine whether the catalyst temperature is still less than the threshold value. While the engine is still running and the catalyst temperature is less than the threshold value, the method 600 may continue in this manner.

It can be observed that the method 600 may accommodate both cold and warm start conditions. For example, if there is a warm start and the catalyst temperature is above the threshold value, the method 600 will operate the engine in the normal operation and then end. If, on the other hand, there is a warm start with catalyst temperature lower than the threshold value, in general, the method 600 will, like with cold starts, operate the engine in the emissions reduction mode and remain there as long as there is no driver demanded power and the engine is running. And upon the driver demanding power under these circumstances, the method 600 will proceed as noted above and determine what combination of the engine alone or some combination of both the engine and the battery is appropriate to meet the driver demanded power while striving to keep the engine at least in close proximity to the recommended power for the emissions reduction mode until the catalyst temperature has met the threshold value. It should also be noted that despite being discussed in discrete steps, the steps of the method 600 may be performed in a short period of time (e.g., seconds or milliseconds).

Several (e.g., all) of the concepts discussed above apply here to the method 600. For example, the system may be similar to those hybrid engine emissions management systems discussed above. As noted prior, the threshold value may be predetermined and/or the threshold value may be defined via a plurality threshold values stored in a memory device of the controller and characterized according to parameters of the hybrid powerplant (e.g., the engine, the aftertreatment system, etc.). Determining the emissions reduction mode having the threshold value for the emissions information and having the engine power corresponding thereto may include deriving the threshold value from the memory device. As noted prior, the engine start event may be a cold start of the engine.

While the present disclosure has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. An emissions management system for transient emissions at different engine powers of an engine in a hybrid system,
the emissions management system comprising:
a sensor assembly configured to provide an activation signal throughout engine operation and to detect information indicative of a catalyst temperature, the information including an exhaust flow rate, an exhaust temperature, an engine out NOx, and an engine power; and
a controller in communication with the sensor assembly, the controller being configured to:
receive the activation signal and, in response thereto, the information from the sensor assembly,
determine an emission penalty based on the information, the emissions penalty corresponding to a tradeoff after which increasing the exhaust temperature and engine power causes an exponential increase in the engine out NOx and exhaust flow rate;
determine, based on the emissions penalty, an emissions reduction mode at which to operate the hybrid system throughout operation of the engine so long as a combination of the engine in the emissions reduction mode and the battery are able to meet a driver demanded power, the emissions reduction mode having a threshold value for the catalyst temperature and both an emissions rate and an engine power corresponding thereto,
monitor the information indicative of the catalyst temperature,
compare the catalyst temperature to the threshold value,
cause the engine to operate in the emissions reduction mode while the catalyst temperature is less than the threshold value, and
allow the engine to operate in a normal operation mode while the catalyst temperature is greater than or equal to the threshold value.

2. The emissions management system of claim 1, wherein the threshold value is predetermined, and wherein the threshold value is indicative of when the emission penalty for faster catalyst warm up occurs so as to inhibit the rapid increase in the emissions rate for the faster catalyst warm up to the catalyst temperature after the engine start event based on each of the engine power, an exhaust temperature, and an exhaust flow rate of the hybrid system.

3. The emissions management system of claim 1, wherein the threshold value is predefined in a memory device of the controller, the memory device having a plurality of stored threshold values each of which is characterized according to at least one engine parameter, and wherein the controller determines the threshold value by retrieving the threshold value from the memory device.

4. The emissions management system of claim 1, wherein the emissions management system is configured to operate when the engine start event is a cold start of the engine and when the engine start event is a warm start of the engine.

5. The emissions management system of claim 1, wherein the sensor assembly is further configured to detect information indicative of a driver demanded power, a battery state of charge, and a battery temperature, and wherein when the catalyst temperature is below the threshold value, the controller is further configured to:
determine a power output of the engine during a warming time period that allows a catalyst to reach the threshold value given the power output; and
determine a percentage of the driver demanded power that is achievable by a battery based on at least one of the battery state of charge and the battery temperature.

6. The emissions management system of claim 5, wherein when the driver demanded power may be met by the engine power in the emissions reduction mode, the controller is further configured to cause the engine to meet the driver demanded power.

7. The emissions management system of claim 6, wherein when the driver demanded power exceeds the power output of the engine operating in the emissions reduction mode and the percentage of the driver demanded power that is achievable by the battery may supplement the power output of the engine operating in the emissions reduction mode to meet the driver demanded power, the controller is further configured to cause the engine and the battery to meet the driver demanded power together.

8. The emissions management system of claim 7, wherein when the driver demanded power exceeds the power output of the engine operating in the emissions reduction mode and the percentage of the driver demanded power that is achievable by the battery, the controller is further configured to cause the engine to increase the power output beyond that corresponding to the emissions reduction mode.

9. The emissions management system of claim 8, wherein the controller is further configured to return the engine to the emissions reduction mode upon absence of the driver demanded power and when the catalyst temperature is below the threshold value.

10. The emissions management system of claim 8, wherein together with causing the engine to increase the power output beyond that corresponding to the emissions reduction mode, the controller is further configured to cause the battery to discharge a maximum percentage of the driver demanded power that is achievable by the battery.

11. The emissions management system of claim 1, wherein the information indicative of the catalyst temperature includes detecting at least one of a temperature drop across a catalytic converter connected to the engine and a conversion efficiency of the catalytic converter connected to the engine.

12. A method of managing transient emissions at different engine powers of an engine of a hybrid system, whereupon receipt of an activation signal, the method comprises:
receiving information corresponding to a detection of a catalyst temperature;
receiving an indication of a determination of an emissions reduction mode having a threshold value for the catalyst temperature and having an engine power corresponding thereto, the threshold value being indicative of when an emission penalty for faster catalyst warm up occurs, the emissions penalty indicating a tradeoff after which increasing the exhaust temperature and engine power causes an exponential increase in the engine out NOx and exhaust flow rate;
receiving an indication of a comparison of the catalyst temperature to the threshold value;
causing an engine to operate in the emissions reduction mode so long as the catalyst temperature is less than the threshold value throughout operation of the engine; and allowing the engine power to operate in a normal operation mode while the catalyst temperature is greater than or equal to the threshold value.

13. The method of claim 12, wherein the threshold value is predetermined.

14. The method of claim 12, wherein determining the emissions reduction mode having the threshold value for the catalyst temperature and the engine power corresponding thereto includes retrieving a predefined threshold value from a plurality of threshold values characterized according to parameters of the engine.

15. The method of claim 12, wherein the engine start event is a cold start of the engine.

16. The method of claim 12, wherein the method further comprises:
  detecting information indicative of a driver demanded power, a battery state of charge, and a battery temperature;
  determining a power output of the engine during a warming time period that allows a catalyst to reach the threshold value given the power output;
  determining a percentage of the driver demanded power that is achievable by a battery based on at least one of the battery state of charge and the battery temperature; and
  causing the engine and the battery to meet the driver demanded power together when the driver demanded power exceeds the power output of the engine operating in the emissions reduction mode and the percentage of the driver demanded power that is achievable by the battery may supplement the power output of the engine operating in the emissions reduction mode to meet the driver demanded power.

17. A hybrid system comprising:
  a hybrid powerplant having an engine, a battery, an electric motor operatively connected to the engine and the battery, and an aftertreatment system operatively connected to the engine; and
  an emissions management system in operative communication with the hybrid powerplant, the emissions management system configured to manage transient emissions at different engine powers of an engine in the hybrid powerplant and comprising:
    at least one sensor configured to operatively connect to the engine, the battery, the electric motor, and the aftertreatment system of the hybrid powerplant to provide an activation signal in response to a hybrid powerplant start event and to detect information indicative of a catalyst temperature; and
    a controller in communication with the at least one sensor, the controller being configured to:
      receive information from the at least one sensor;
      determine an emissions reduction mode having a threshold value for the catalyst temperature and having an engine power corresponding thereto, the threshold value being indicative of when an emission penalty for faster catalyst warm up occurs such that despite increasing catalyst temperature faster, targeting higher exhaust temperatures by increasing engine power exponentially increases exhaust flow rate and engine emissions rates;
      monitor the information indicative of the catalyst temperature;
      compare the catalyst temperature to the threshold value;
      cause the hybrid powerplant to operate in the emissions reduction mode so long as the catalyst temperature is less than the threshold value throughout operation of the engine; and
      allow the hybrid powerplant to operate in a normal operation mode while the catalyst temperature is greater than or equal to the threshold value.

18. The hybrid powerplant of claim 17, wherein the hybrid powerplant is a series hybrid powerplant, a parallel hybrid powerplant, or a series-parallel hybrid powerplant.

19. The hybrid powerplant of claim 17, wherein the controller causes the hybrid powerplant to operate in the emissions reduction mode while the catalyst temperature is less than the threshold value by causing the electric motor to receive discharge from the battery while causing the engine to progress the catalyst temperature toward the threshold value.

20. The hybrid powerplant of claim 17, wherein the controller is further configured to:
  detecting information indicative of a driver demanded power, a battery state of charge, and a battery temperature;
  determine a power output of the engine during a warming time period that allows a catalyst to reach the threshold value given the power output;
  determine a percentage of the driver demanded power that is achievable by the battery based on at least one of the battery state of charge and the battery temperature; and
  cause the engine and the battery to meet the driver demanded power together when the driver demanded power exceeds the power output of the engine operating in the emissions reduction mode and the percentage of the driver demanded power that is achievable by the battery may supplement the power output of the engine operating in the emissions reduction mode to meet the driver demanded power.

* * * * *